US012396396B1

(12) United States Patent
Li et al.

(10) Patent No.: US 12,396,396 B1
(45) Date of Patent: Aug. 26, 2025

(54) UPSTANDING CLAMPING LONGITUDINAL CONVEYOR SYSTEM FOR WHOLE-STEM REED HARVESTING, METHOD, AND HARVESTER

(71) Applicant: Jiangsu University, Jiangsu (CN)

(72) Inventors: Yaoming Li, Jiangsu (CN); Binbin Ji, Jiangsu (CN); Kuizhou Ji, Jiangsu (CN); Yanbin Liu, Jiangsu (CN); Zhenwei Liang, Jiangsu (CN); Tuo Du, Jiangsu (CN)

(73) Assignee: Jiangsu University, Jiangsu (CN)

(*) Notice: Subject to any disclaimer, the term of this patent is extended or adjusted under 35 U.S.C. 154(b) by 0 days.

(21) Appl. No.: 18/839,026

(22) PCT Filed: Nov. 24, 2023

(86) PCT No.: PCT/CN2023/133839
§ 371 (c)(1),
(2) Date: Aug. 16, 2024

(87) PCT Pub. No.: WO2025/091589
PCT Pub. Date: May 8, 2025

(30) Foreign Application Priority Data

Nov. 1, 2023 (CN) .......................... 202311440808.7

(51) Int. Cl.
*A01D 45/00* (2018.01)
*A01D 34/74* (2006.01)
(Continued)

(52) U.S. Cl.
CPC ........... *A01D 45/065* (2013.01); *A01D 34/74* (2013.01); *A01D 45/00* (2013.01); *A01D 61/008* (2013.01);
(Continued)

(58) Field of Classification Search
CPC ...... A01D 45/00; A01D 45/065; A01D 34/74; A01D 57/22
See application file for complete search history.

(56) References Cited

U.S. PATENT DOCUMENTS

2025/0176466 A1* 6/2025 Li ........................ A01D 85/005

FOREIGN PATENT DOCUMENTS

| CN | 2781747 | 5/2006 |
|----|---------|--------|
| CN | 202617708 | 12/2012 |

(Continued)

OTHER PUBLICATIONS

"International Search Report (Form PCT/ISA/210) of PCT/CN2023/133839", mailed on Apr. 6, 2024, pp. 1-4.
(Continued)

*Primary Examiner* — Alicia Torres
(74) *Attorney, Agent, or Firm* — JCIPRNET (57) ABSTRACT

An upstanding clamping longitudinal conveyor system for whole-stem reed harvesting includes a conveyor device, a height adjustment mechanism, and a control unit. A preharvest detection unit is configured to detect height information of reeds in a preharvest region, and transmit the height information to the control unit. A position sensor is configured to detect a current height of the conveyor device, and transmit the current height to the control unit. A lifting device is connected to the conveyor device; and the control unit is configured to calculate an average height of the reeds in the preharvest region and a height of center of gravity of the reeds, calculate a height difference between the height of the center of gravity of the reeds and the current height of the conveyor device, and adjust a position of the conveyor device to correspond to the center of gravity of the reeds in the preharvest region.

8 Claims, 9 Drawing Sheets

(51) Int. Cl.
*A01D 45/06* (2006.01)
*A01D 57/22* (2006.01)
*A01D 61/00* (2006.01)
*A01D 61/04* (2006.01)
*A01D 69/02* (2006.01)
*G01S 7/48* (2006.01)
*G01S 17/42* (2006.01)

(52) U.S. Cl.
CPC ............ *A01D 61/04* (2013.01); *A01D 69/02* (2013.01); *G01S 7/4808* (2013.01); *G01S 17/42* (2013.01)

(56) References Cited

FOREIGN PATENT DOCUMENTS

| | | |
|---|---|---|
| CN | 208191332 | 12/2018 |
| CN | 111406508 | 7/2020 |
| CN | 216905966 | 7/2022 |
| CN | 117256312 A * | 12/2023 |
| FR | 2429552 | 1/1980 |

OTHER PUBLICATIONS

"Written Opinion of the International Searching Authority (Form PCT/ISA/237) of PCT/CN2023/133839", mailed on Apr. 6, 2024, pp. 1-4.

\* cited by examiner

UPSTANDING CLAMPING LONGITUDINAL CONVEYOR SYSTEM FOR WHOLE-STEM REED HARVESTING, METHOD, AND HARVESTER

CROSS-REFERENCE TO RELATED APPLICATION

This application is a 371 of international application of PCT application serial no. PCT/CN2023/133839 filed on Nov. 24, 2023 which claims the priority benefit of China application no. 202311440808.7 filed on Nov. 1, 2023. The entirety of each of the above-mentioned patent applications is hereby incorporated by reference herein and made a part of this specification.

TECHNICAL FIELD

The present disclosure belongs to the technical field of intelligent agricultural machinery, and particularly relates to an upstanding clamping longitudinal conveyor system for whole-stem reed harvesting, a control method, and a harvester.

DESCRIPTION OF RELATED ART

Reed harvester is a device for mechanically harvesting mature reeds in reed fields. Usually, the reed harvester harvests the reeds in two ways, one of which is to smash harvested reeds immediately and compress smashed reeds into square bales or circular bales, and the other is to harvest whole stems of reeds and pack the reeds into bales. Concerning the reed harvester that harvests whole stems of reeds and packs the reeds into bales, after roots of the reeds are cut by a knife, the reeds are gathered by a transverse conveyor chain of a header to a middle of the header, clamped stably by an upstanding clamping longitudinal conveyor chain of the header, and conveyed to a baler.

For the existing reed harvester, to realize longitudinal clamping conveyance of the reeds, a clamping conveyor system with a fixed height is provided or heights of the reeds are determined manually in a shutdown state and a height of the upstanding clamping conveyor chain is adjusted manually with the help of a tool. The method for estimating the heights of the reeds manually and adjusting the height of the upstanding clamping longitudinal conveyor chain has poor accuracy and low efficiency, and cannot solve the problem of real-time adjustment on the clamping conveyor chain in harvesting of the reed harvester fundamentally. From a development trend of automatic harvesting of the reed harvester, it is desirable to provide a device capable of detecting the heights of the reeds in real time and adjusting the height of the clamping conveyor chain correspondingly.

At present, a system capable of adjusting the height of the upstanding clamping longitudinal conveyor device of the reed harvester in real time with a preharvest reed height detection device of the reed harvester remains unavailable in related patents or literatures.

SUMMARY

In view of the above-mentioned technical problems, the present disclosure provides an upstanding clamping longitudinal conveyor system for whole-stem reed harvesting, a control method, and a harvester. By acquiring height information of reeds in a preharvest region and adjusting a relative height of a conveyor device in real time to correspond to a gravity center of the reeds, the present disclosure can make the conveyor device adapted for different heights of the reeds through height adjustment, and can clamp the reeds reliably and tidily for conveyance, thereby greatly improving tidiness of the reeds in the reed conveyance, and being more convenient for subsequent bale knotting of the reeds.

It is to be noted that disclosures on these objectives do not exclude presence of other objectives. One implementation in the present disclosure is unnecessarily intended to realize all of the above objectives. Objectives rather than the above objectives can be obtained from the disclosures on the specification, accompanying drawings and claims.

The present disclosure achieves the above technical objective through following technical solutions.

An upstanding clamping longitudinal conveyor system for whole-stem reed harvesting includes an upstanding clamping longitudinal conveyor device, a clamping conveyor chain height adjustment mechanism, and a control unit, where the clamping conveyor chain height adjustment mechanism includes a preharvest detection unit, a position sensor, and a lifting device; the preharvest detection unit is configured to detect height information of reeds in a preharvest region, and transmit the height information to the control unit; the position sensor is configured to detect a current height of the upstanding clamping longitudinal conveyor device, and transmit the current height to the control unit; and the lifting device is connected to the upstanding clamping longitudinal conveyor device; and the control unit is connected to the preharvest detection unit and the lifting device; the control unit is configured to calculate an average height of the reeds in the preharvest region according to the height information detected by the preharvest detection unit for the reeds in the preharvest region, calculate a height of a gravity center of the reeds, and seek a height difference between the height of the gravity center of the reeds and the current height of the upstanding clamping longitudinal conveyor device, and control, according to the height difference, the lifting device to adjust a position of the upstanding clamping longitudinal conveyor device to correspond to the gravity center of the reeds in the preharvest region.

In the above solution, the preharvest detection unit includes a laser radar; and the laser radar is configured to scan to-be-harvested reeds in front of a header at a sampling interval T, acquire point cloud data for reflection points of the to-be-harvested reeds in polar coordinate of the laser radar, and transmit the point cloud data to the control unit; and the control unit is configured to process the point cloud data to obtain a point cloud in a square region specified in front of the header, uniformly segment the square region into a plurality of sub-regions that are equal, calculate a maximum of a point cloud y coordinate in each of the plurality of sub-regions, take the maximum $y_{ijmax}$ as an average height of reeds in each of the plurality of sub-regions, and seek an average $y_{avg}$ in the square region according to the $y_{ijmax}$ representing the average height of the reeds in each of the plurality of sub-regions, where the average $y_{avg}$ represents the average height of the reeds in the preharvest region.

In the above solution, the lifting device includes a speed reduction motor, a coupled twin winch, a first pulley set, a second pulley set, a support, and a sleeve;

the support is provided at two sides of the upstanding clamping longitudinal conveyor device; the support is connected to a girder of the header; and the upstanding clamping longitudinal conveyor device is connected to a vertical beam of the support through the sleeve;

the speed reduction motor and the coupled twin winch are provided on a top of the support; and the first pulley set is provided at two sides of an upper portion of the support, and connected to an upper portion of the upstanding clamping longitudinal conveyor device; and the second pulley set is provided at two sides of a lower portion of the support, and connected to a lower portion of the upstanding clamping longitudinal conveyor device; a wire rope of the first pulley set and of the second pulley set is connected to the coupled twin winch; and the coupled twin winch driven by the speed reduction motor drives the wire rope to realize retraction and release of the wire rope, thereby driving the upstanding clamping longitudinal conveyor device to move up and down along the vertical beam of the support.

Further, the upstanding clamping longitudinal conveyor device includes two symmetric upstanding longitudinal conveyor mechanisms; and the two symmetric upstanding longitudinal conveyor mechanisms clamp upstanding reeds when longitudinally conveying the reeds;

the two symmetric upstanding longitudinal conveyor mechanisms each include an upstanding conveyor unit and the sleeve;

the upstanding conveyor unit includes a traction roller, a driven roller, a clamping conveyor chain, an upper beam, and a lower beam;

the upper beam is located above the lower beam; the traction roller includes one end connected to one end of the upper beam, and another end connected to one end of the lower beam; the driven roller includes one end connected to another end of the upper beam, and another end connected to another end of the lower beam; and the clamping conveyor chain surrounds the traction roller and the driven roller; and the upper beam and the lower beam are connected to the sleeve; the sleeve is provided on the vertical beam of the support; and the sleeve is slidable up and down along the vertical beam of the support, thereby driving the upstanding conveyor unit to move up and down.

In the above solution, the speed reduction motor is provided with an electromagnetic brake system.

A harvester includes the upstanding clamping longitudinal conveyor system for whole-stem reed harvesting.

A control method of the upstanding clamping longitudinal conveyor system for whole-stem reed harvesting includes the following steps:

setting a coordinate of the laser radar of the preharvest detection unit, and scanning, by the laser radar, the to-be-harvested reeds in front of the header, acquiring the point cloud data for the reflection points of the reeds at the laser radar, and transmitting the point cloud data to the control unit; and performing, by the control unit, coordinate transformation on the point cloud data, filtering the point cloud data, uniformly segmenting the point cloud data in the preharvest region into a plurality of sub-regions, acquiring a maximum $y_{ijmax}$ of a point cloud y coordinate in each of the plurality of sub-regions, calculating the average height $y_{avg}$ for the reeds in the preharvest region, calculating the height of the gravity center of the reeds, and acquiring the current height of the upstanding clamping longitudinal conveyor device through the position sensor; calculating, by the control unit, the height difference between the height of the gravity center of the reeds and the current height of the upstanding clamping longitudinal conveyor device; and controlling, according to the height difference, the lifting device to adjust the position of the upstanding clamping longitudinal conveyor device to correspond to the gravity center of the reeds in the preharvest region.

In the above solution, the setting of the coordinate of the laser radar of the preharvest detection unit specifically includes:

providing a laser radar base with an adjustable dip angle on a top of the header and at a height of h above the ground, setting the dip angle of the laser radar base as θ, and providing the laser radar on the laser radar base, where an origin O' in the polar coordinate of the laser radar has a height of h above the ground;

establishing a geodetic coordinate system O (X, Y, Z) on the ground fittingly below the origin O' in the polar coordinate of the laser radar, a vertical distance from an origin O in the geodetic coordinate system to the origin O' in the polar coordinate of the laser radar is the height h; establishing, with the origin O' in the polar coordinate of the laser radar as an origin, a rectangular coordinate system O'(X', Y', Z') along a direction for setting the dip angle θ, where the rectangular coordinate system includes an X' axis having a same direction as an X axis of the geodetic coordinate system, a Y' axis forming an included angle of θ with a Y axis of the geodetic coordinate system, and a Z' axis forming an included angle of θ with a Z axis of the geodetic coordinate system; and scanning, by the laser radar, the to-be-harvested reeds in front of the header at the sampling interval T, acquiring the point cloud data for the reflection points of the reeds in the polar coordinate of the laser radar, and transmitting the point cloud data to the control unit, where the cloud point data includes a radius, an elevation, an azimuth, and an intensity of each of the reflection points; and the performing, by the control unit, of the coordinate transformation on the point cloud data specifically includes:

transforming, by the control unit, the radius, the point cloud data into rectangular coordinate values in the rectangular coordinate system O' (X', Y', Z'), according to the radius, the elevation, and the azimuth of each of the reflection points in the point cloud, by:

$$\begin{cases} X' = \text{radius} \cdot \cos(\text{evelation}) \cdot \cos(\text{azimuth}) \\ Y' = \text{radius} \cdot \cos(\text{evelation}) \cdot \sin(\text{azimuth}) \\ Z' = \text{radius} \cdot \sin(\text{evelation}) \end{cases}$$

where, X', Y', and Z' are respectively three coordinate axes in the rectangular coordinate system O'; and transforming, by the control unit, the rectangular coordinate values of the point cloud in the rectangular coordinate system O' (X', Y', Z') into coordinate values in the geodetic coordinate system O (X, Y, Z) by:

$$\begin{cases} X = X' \\ Y = Y' \cdot \cos\theta + h \\ Z = Z' \cdot \sin\theta \end{cases}$$

where, X, Y, and Z are respectively three coordinate axes in the geodetic coordinate system O.

In the above solution, processing, by the control unit, the point cloud data to calculate the average height of the reeds in the preharvest region specifically includes:

processing, by the control unit, the point cloud data, filtering out a noise point in the point cloud with a filter, filtering out a point cloud out of the square region specified in front of the header with a pass-through filter, and retaining the point cloud in the square region, where the point cloud in the square region reflects canopy height information of the reeds in front of the header; and uniformly segmenting the square region into the plurality of sub-regions that are equal, calculating the maximum of the point cloud y coordinate in each of the plurality of sub-regions, taking the maximum $y_{ijmax}$ as the average height of the reeds in each of the plurality of sub-regions, and seeking the average $y_{avg}$ in the square region according to the $y_{ijmax}$ representing the average height of the reeds in each of the plurality of sub-regions, where the average $y_{avg}$ represents the average height of the reeds in the preharvest region.

In the above solution, the adjusting, by the lifting device, of the position of the upstanding clamping longitudinal conveyor device to correspond to the gravity center of the reeds in the preharvest region specifically includes:

driving, by the speed reduction motor of the lifting device, the coupled twin winch to rotate clockwise, where the coupled twin winch includes a driving pulley A and a driving pulley B, the driving pulley A and the driving pulley B are fixedly connected and rotate at the same time, the driving pulley A in the coupled twin winch drives the first pulley set, and the first pulley set driven by the driving pulley A in the coupled twin winch drives the upstanding clamping longitudinal conveyor device to move up; and the driving pulley B in the coupled twin winch is connected to the second pulley set, and the driving pulley B is in a rope releasing state, to ensure that the upstanding clamping longitudinal conveyor device moves up; and driving, by the speed reduction motor, the coupled twin winch to rotate counterclockwise, where the driving pulley B in the coupled twin winch drives the second pulley set, and the second pulley set driven by the driving pulley B in the coupled twin winch drives the upstanding clamping longitudinal conveyor device to move down; and the driving pulley A in the coupled twin winch is connected to the first pulley set, and the driving pulley A is in a rope releasing state, to ensure that the upstanding clamping longitudinal conveyor device moves down.

Compared with the prior art, the present disclosure has the following advantages:

1. By scanning and measuring the preharvest reeds with the laser radar in real time, the present disclosure realizes contactless accurate measurement on heights of the reeds, and solves problems of poor accuracy and low efficiency of manual estimation with eyes.

2. By acquiring the height information of the reeds with the laser radar and adjusting the relative height of the conveyor device in real time, the present disclosure greatly improves tidiness of the reeds in the reed conveyance, and is more convenient for bale knotting of the reeds.

3. With a movable design of the upstanding clamping longitudinal conveyor device, the present disclosure can make the conveyor device adapted for different heights of the reeds through height adjustment, and can clamp the reeds reliably and tidily for conveyance.

4. By adjusting the height of the whole conveyor device with the pulley set, the present disclosure greatly simplifies a height adjustment mechanism and saves a cost. On the other hand, the pulley set cooperates with the wire rope to drive the upstanding clamping longitudinal conveyor device to move, such that the upstanding clamping longitudinal conveyor device is stressed more uniformly, and moves more reliably.

5. The speed reduction motor cooperates with the electromagnetic brake system to drive the pulley set, such that the motor is controlled more reliably and more conveniently, and the position is also controlled more accurately. With the electromagnetic brake system, the clamping conveyor chain is stable at a preset position.

It is to be noted that disclosures on these effects do not exclude presence of other effects. One implementation of the present disclosure unnecessarily has all of the above effects. Effects rather than the above effects can be seen and obtained apparently from the disclosures on the specification, accompanying drawings and claims.

DESCRIPTION OF THE EMBODIMENTS

The embodiments of the present disclosure are described below in detail. Examples of the embodiments are shown in the drawings. The same or similar numerals represent the same or similar elements or elements having the same or similar functions throughout the specification. The embodiments described below with reference to the drawings are illustrative for explaining the present disclosure and are not to be construed as limiting the present disclosure.

It should be understood that, in the description of the present disclosure, the terms such as "central", "longitudinal", "transverse", "length", "width", "thickness", "upper", "lower", "axial", "radial", "vertical", "horizontal", "inner", and "outer" are intended to indicate orientations or positional relations shown in the drawings. It should be noted that these terms are merely intended to facilitate a simple description of the present disclosure, rather than to indicate or imply that the mentioned devices or elements must have the specific orientation or be constructed and operated in the specific orientation. Therefore, these terms may not be construed as a limitation to the present disclosure. In addition, the terms "first" and "second" are merely intended for a purpose of description, and shall not be understood as an indication or implication of relative importance or implicit indication of a quantity of indicated technical features. Thus, features defined with "first" and "second" may explicitly or implicitly include one or more of the features. In the description of the present disclosure, "a plurality of" means two or more, unless otherwise specifically defined.

In the present disclosure, unless otherwise clearly specified and defined, meanings of terms "install", "connect with", "connect to" and "fixed to" should be understood in a broad sense. For example, the connection may be a fixed connection, a removable connection, or an integral connection; may be a mechanical connection or an electrical connection; may be a direct connection or an indirect connection via a medium; or may be intercommunication between two components. Those of ordinary skill in the art may understand specific meanings of the above terms in the present disclosure based on a specific situation.

Embodiment 1

FIG. 1 to FIG. 9 show a preferred implementation of an upstanding clamping longitudinal conveyor system for whole-stem reed harvesting. The upstanding clamping longitudinal conveyor system for whole-stem reed harvesting includes an upstanding clamping longitudinal conveyor device 101, a clamping conveyor chain height adjustment mechanism, and a control unit 7.

The clamping conveyor chain height adjustment mechanism includes a preharvest detection unit, a position sensor, and a lifting device 105. The preharvest detection unit is configured to detect height information of reeds in a preharvest region, and transmit the height information to the control unit. The position sensor is configured to detect a current height of the upstanding clamping longitudinal conveyor device 101, and transmit the current height to the control unit. The lifting device is connected to the upstanding clamping longitudinal conveyor device 101.

The control unit 7 is connected to the preharvest detection unit and the lifting device. The control unit 7 is configured to calculate an average height of the reeds in the preharvest region according to the height information detected by the preharvest detection unit for the reeds in the preharvest region, calculate a height of a gravity center of the reeds, seek a height difference between the height of the gravity center of the reeds and the current height of the upstanding clamping longitudinal conveyor device 101, and control, according to the height difference, the lifting device to adjust a position of the upstanding clamping longitudinal conveyor device 101 to correspond to the gravity center of the reeds in the preharvest region. Therefore, the present disclosure can make a clamping conveyor chain 105-11 adapted for different heights of the reeds through height adjustment, and can clamp the reeds reliably and tidily for conveyance, thereby greatly improving tidiness of the reeds in the reed conveyance, and being more convenient for bale knotting of the reeds.

The preharvest detection unit includes a laser radar 104. By scanning and measuring the preharvest reeds with the laser radar 104 in real time, the present disclosure realizes contactless accurate measurement on heights of the reeds, and solves problems of poor accuracy and low efficiency of manual eye estimation.

The laser radar 104 is configured to scan to-be-harvested reeds in front of a header 1 at a sampling interval T, acquire point cloud data for reflection points of the to-be-harvested reeds in polar coordinate of the laser radar 104, and transmit the point cloud data to the control unit 7. The control unit 7 is configured to process the point cloud data to obtain a point cloud in a square region specified in front of the header 1, uniformly segment the square region into a plurality of sub-regions that are equal, calculate a maximum of a point cloud y coordinate in each of the plurality of sub-regions, take the maximum $y_{ijmax}$ as an average height of reeds in each of the plurality of sub-regions, and seek an average $y_{avg}$ in the square region according to the $y_{ijmax}$ representing the average height of the reeds in each of the plurality of sub-regions. The average represents the average height of the reeds in the preharvest region.

The lifting device includes a speed reduction motor 105-1, a coupled twin winch 105-2, a first pulley set 105-3, a second pulley set 105-4, a support 105-5, and a sleeve 105-6.

The support 105-5 is provided at two sides of the upstanding clamping longitudinal conveyor device 101. The support 105-5 is connected to a girder of the header 1. The upstanding clamping longitudinal conveyor device 101 is connected to a vertical beam of the support 105-5 through the sleeve 105-6. The upstanding clamping longitudinal conveyor device 101 can move up and down along the vertical beam of the support 105-5 for position adjustment.

The speed reduction motor 105-1 and the coupled twin winch 105-2 are provided on a top of the support 105-5. The first pulley set 105-3 is provided at two sides of an upper portion of the support 105-5, connected to an upper portion of the upstanding clamping longitudinal conveyor device 101, and configured to move up the upstanding clamping longitudinal conveyor device 101.

The second pulley set 105-4 is provided at two sides of a lower portion of the support 105-5, connected to a lower portion of the upstanding clamping longitudinal conveyor device 101, and configured to move down the upstanding clamping longitudinal conveyor device 101. A wire rope 105-7 of the first pulley set 105-3 and a wire rope of the second pulley set 105-4 are connected to the coupled twin winch 105-2. The coupled twin winch 105-2 driven by the speed reduction motor 105-1 drives the wire rope to realize retraction and release of the wire rope, thereby driving the upstanding clamping longitudinal conveyor device 101 to move up and down along the vertical beam of the support 105-5.

Preferably, the coupled twin winch 105-2 includes two winches. The two winches rotate together with a motor shaft. The coupled twin winch driven by a single machine shaft drives the wire rope 105-7 to realize retraction and release of the wire rope 105-7, thereby driving the upstanding clamping longitudinal conveyor device to move up and down.

Figure 6:
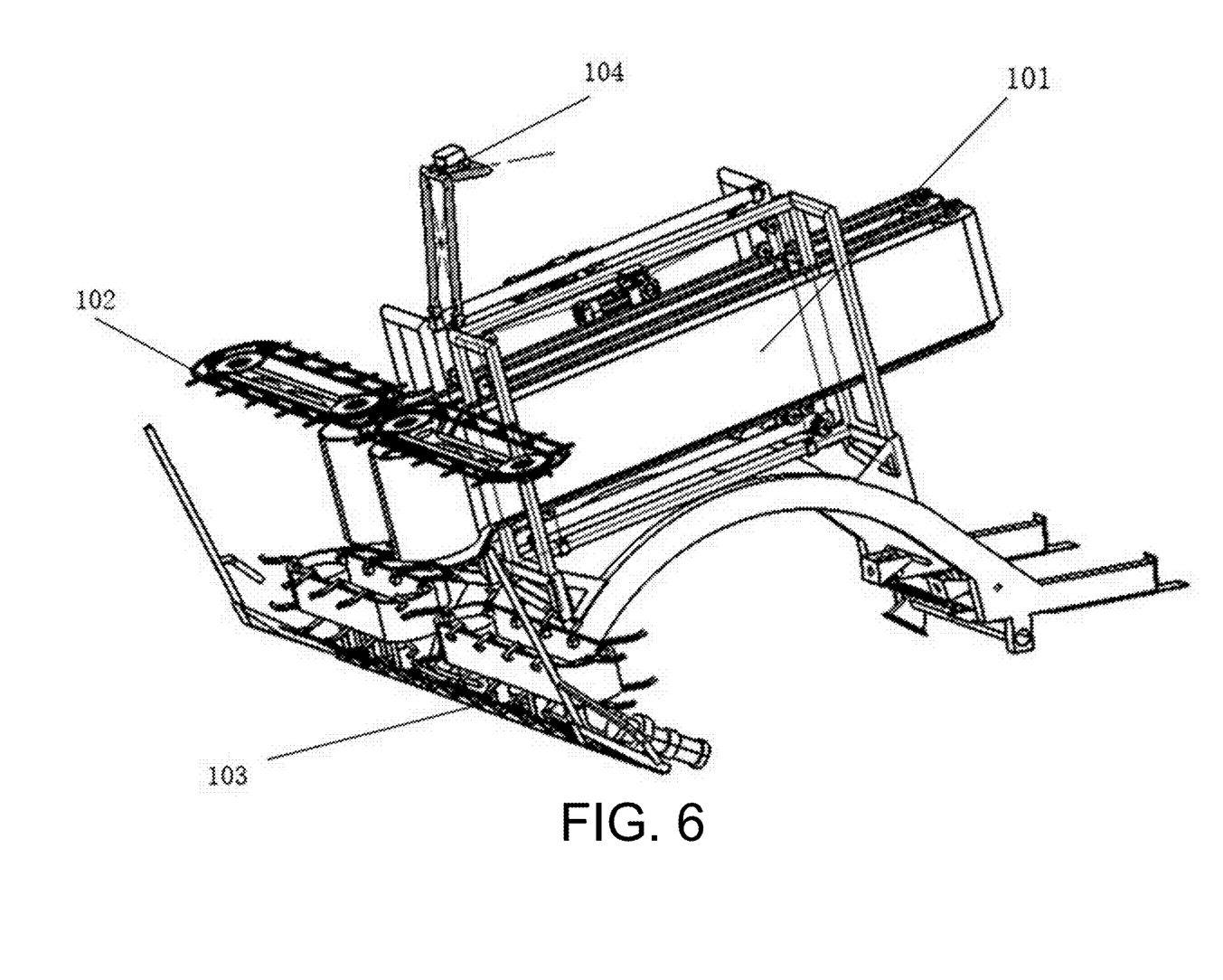
FIG. 6 is a schematic view of an upstanding clamping longitudinal conveyor device according to an implementation of the present disclosure.

As shown in FIG. 6, the upstanding clamping longitudinal conveyor device 101 includes two symmetric upstanding longitudinal conveyor mechanisms. The two symmetric upstanding longitudinal conveyor mechanisms clamp an upstanding reed when longitudinally conveying the reeds.

The two symmetric upstanding longitudinal conveyor mechanisms each include an upstanding conveyor unit and the sleeve 105-6.

Figure 7:
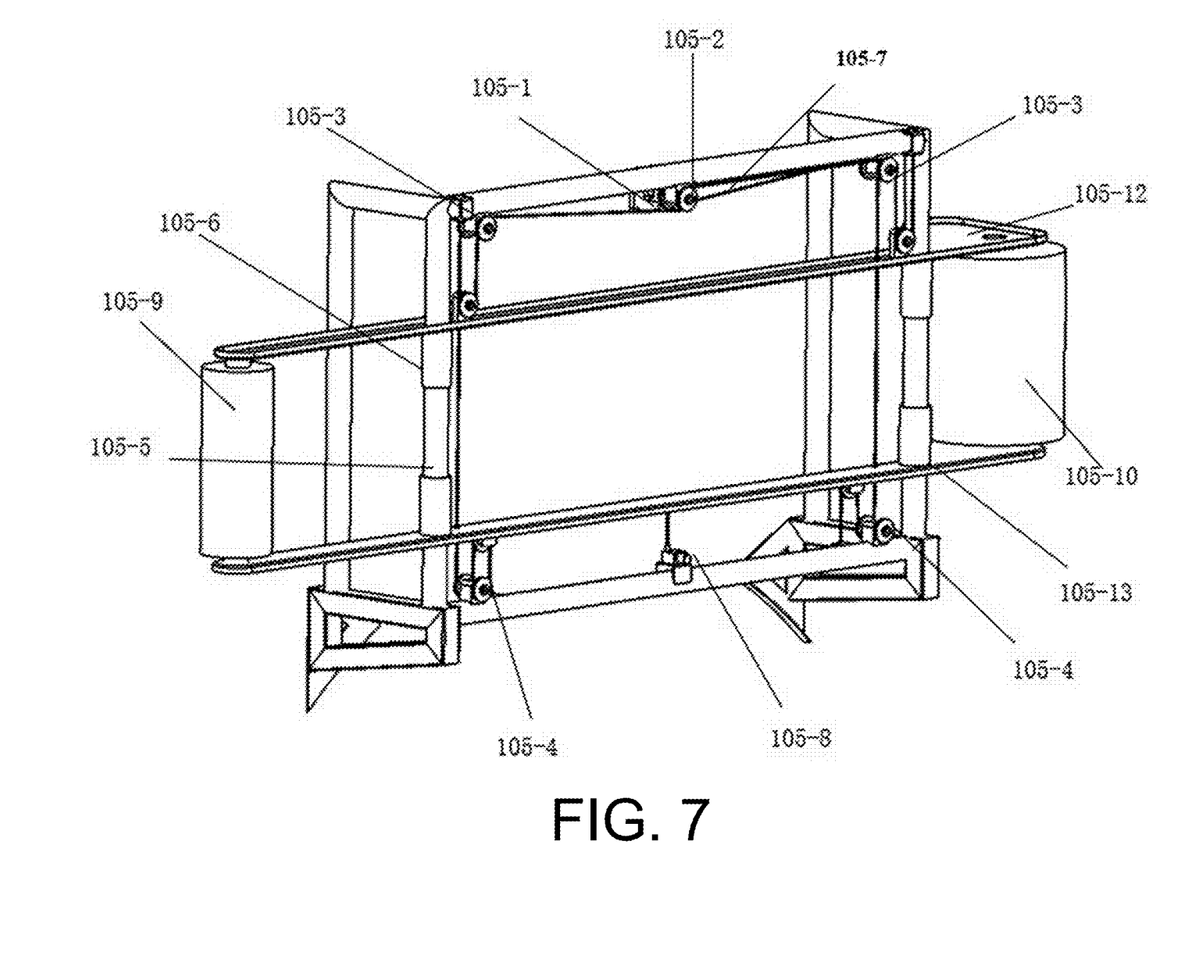
FIG. 7 is a schematic structural view of an upstanding conveyor unit according to an implementation of the present disclosure.

As shown in FIG. 7, the upstanding conveyor unit includes a traction roller 105-9, a driven roller 105-10, a clamping conveyor chain 105-11, an upper beam 105-12, and a lower beam 105-13.

The upper beam 105-12 is located above the lower beam 105-13. The traction roller 105-9 includes one end connected to one end of the upper beam 105-12, and the other end connected to one end of the lower beam 105-13. The driven roller 105-10 includes one end connected to the other end of the upper beam 105-12, and the other end connected to the other end of the lower beam 105-13. The clamping conveyor chain 105-11 surrounds the traction roller 105-9 and the driven roller 105-10.

The upper beam 105-12 and the lower beam 105-13 are connected to the sleeve 105-6. The sleeve 105-6 is provided on the vertical beam of the support 105-5. The sleeve 105-6 can slide up and down along the vertical beam of the support 105-5, thereby driving the upstanding conveyor unit to move up and down.

The first pulley set 105-3 includes at least four pulleys, in which two pulleys are respectively provided at the two sides of the upper portion of the support 105-5, and remaining two pulleys are respectively located at the two sides of the upper portion of the support 105-5, connected to the upper beam 105-12 of the upstanding clamping longitudinal conveyor device 101, and configured to move up the upstanding clamping longitudinal conveyor device 101. The second pulley set 105-4 includes at least four pulleys, in which two pulleys are respectively provided at the two sides of the lower portion of the support 105-5, and remaining two pulleys are respectively located at the two sides of the lower portion of the support 105-5, connected to the lower beam 105-13 of the upstanding clamping longitudinal conveyor device 101, and configured to move down the upstanding clamping longitudinal conveyor device 101.

By adjusting the height of the whole conveyor device with the pulley set, the present disclosure greatly simplifies a height adjustment mechanism and saves a cost. On the other hand, the pulley set cooperates with the wire rope 105-7 to drive the upstanding clamping longitudinal conveyor device 101 to move, such that the upstanding clamping longitudinal conveyor device 101 is stressed more uniformly, and moves more reliably.

Preferably, the position sensor is a rope-pull position sensor 105-8.

The speed reduction motor 105-1 is provided with an electromagnetic brake system. When the rope-pull position sensor 105-8 acquires that the height of the upstanding clamping longitudinal conveyor device 101 corresponds to the height of the gravity center of the reeds in the preharvest region, the control unit 7 cuts off the speed reduction motor 105-1, and the electromagnetic brake system works, such that the upstanding clamping longitudinal conveyor device 101 is stable at a preset height for height adjustment.

As shown in FIG. 2 to FIG. 5, a control method of the upstanding clamping longitudinal conveyor system for whole-stem reed harvesting includes the following steps:

A coordinate of the laser radar 104 of the preharvest detection unit is set. The laser radar 104 scans the to-be-harvested reeds in front of the header 1, acquires the point cloud data for the reflection points of the reeds at the laser radar 104, and transmits the point cloud data to the control unit 7.

The control unit 7 performs coordinate transformation on the point cloud data, filters the point cloud data, uniformly segments the point cloud data in the preharvest region into a plurality of sub-regions, acquires a maximum $y_{ijmax}$ of a point cloud y coordinate in each of the plurality of sub-regions, calculates the average height $y_{avg}$ for the reeds in the preharvest region, calculates the height of the gravity center of the reeds, and acquires the current height of the upstanding clamping longitudinal conveyor device 101 through the position sensor. The control unit 7 calculates the height difference between the height of the gravity center of the reeds and the current height of the upstanding clamping longitudinal conveyor device 101, and controls, according to the height difference, the lifting device to adjust the position of the upstanding clamping longitudinal conveyor device 101 to correspond to the gravity center of the reeds in the preharvest region.

Due to different varieties and habitats of the reeds, the heights of the reeds or the gravity centers of the reeds are different from each other. In order to clamp and convey the reeds reliably and tidily in upstanding clamping longitudinal conveyance of the reeds, the upstanding clamping conveyor chain of the upstanding clamping longitudinal conveyor device 101 in the present disclosure adjusts a clamping position in real time according to the height of the gravity center of the reed, and the clamping conveyor chain is kept near the height of the gravity center of the reeds all the time.

Specifically, in the present disclosure, the laser radar is used to scan the reeds in front of the header of the reed harvester in real time to obtain three-dimensional (3D) point cloud data including growth heights and densities of the reeds. The 3D point cloud data is filtered and mathematically processed to obtain the point cloud data reflecting canopy heights of the reeds. The data is subjected to mean processing to obtain data for the canopy heights of the reeds in a fixed region in front of the header of the reed harvester. According to the data, the lifting device 105 adjusts the height of the upstanding clamping longitudinal conveyor device 101 of the header of the reed harvester in real time, such that the clamping height of the upstanding clamping longitudinal conveyor device 101 is kept near the height of the gravity center of the reeds all the time.

The coordinate of the laser radar 104 of the preharvest detection unit is set, specifically including:

As shown in FIG. 2 to FIG. 5, a laser radar base with an adjustable dip angle is provided on a top of the header 1 and at a height of h above the ground, the dip angle of the laser radar base is set as θ, and the laser radar 104 is provided on the laser radar base. An origin O' in the polar coordinate of the laser radar 104 has a height of h above the ground.

Figure 2:
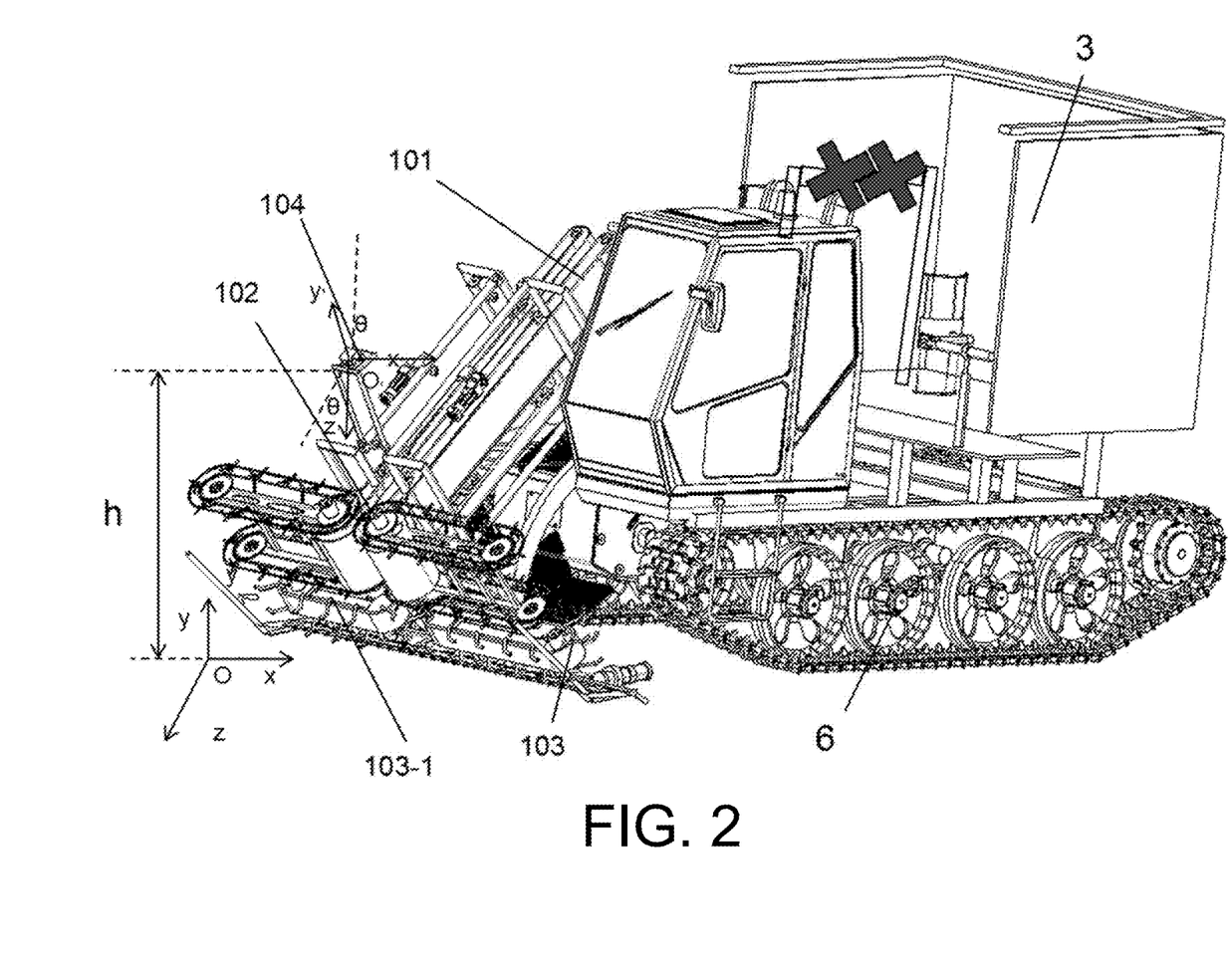
FIG. 2 is a schematic view of a coordinate according to an implementation of the present disclosure.

A geodetic coordinate system O (X, Y, Z) is established on the ground fittingly below the origin O' in the polar coordinate of the laser radar. A vertical distance from an origin O in the geodetic coordinate system to the origin O' in the polar coordinate of the laser radar is the height h.

With the origin O' in the polar coordinate of the laser radar as an origin, a rectangular coordinate system O' (X', Y', Z') is established along a direction for setting the dip angle θ. The rectangular coordinate system includes an X' axis having a same direction as an X axis of the geodetic coordinate system, a Y' axis forming an included angle of θ with a Y axis of the geodetic coordinate system, and a Z' axis forming an included angle of θ with a Z axis of the geodetic coordinate system.

The laser radar 104 scans the to-be-harvested reeds in front of the header 1 at the sampling interval T, acquires the point cloud data for the reflection points of the reeds in the polar coordinate of the laser radar 104, and transmits the point cloud data to the control unit 7. The cloud point data includes a radius, an elevation, an azimuth, and an intensity of each of the reflection points.

The control unit 7 performs the coordinate transformation on the point cloud data, specifically including:

The control unit 7 transforms the point cloud data into rectangular coordinate values in the rectangular coordinate system O' (X', Y', Z'), according to the radius, the elevation, and the azimuth of each of the reflection points in the point cloud, by:

$$\begin{cases} X' = \text{radius} \cdot \cos(\text{evelation}) \cdot \cos(\text{azimuth}) \\ Y' = \text{radius} \cdot \cos(\text{evelation}) \cdot \sin(\text{azimuth}) \\ Z' = \text{radius} \cdot \sin(\text{evelation}) \end{cases}$$

where, X', Y', and Z' are respectively three coordinate axes in the rectangular coordinate system O'.

The control unit transforms the rectangular coordinate values of the point cloud in the rectangular coordinate system O' (X', Y', Z') into coordinate values in the geodetic coordinate system O (X, Y, Z) by:

$$\begin{cases} X = X' \\ Y = Y' \cdot \cos\theta + h \\ Z = Z' \cdot \sin\theta \end{cases}$$

where, X, Y, and Z are respectively three coordinate axes in the geodetic coordinate system O.

Figure 3:
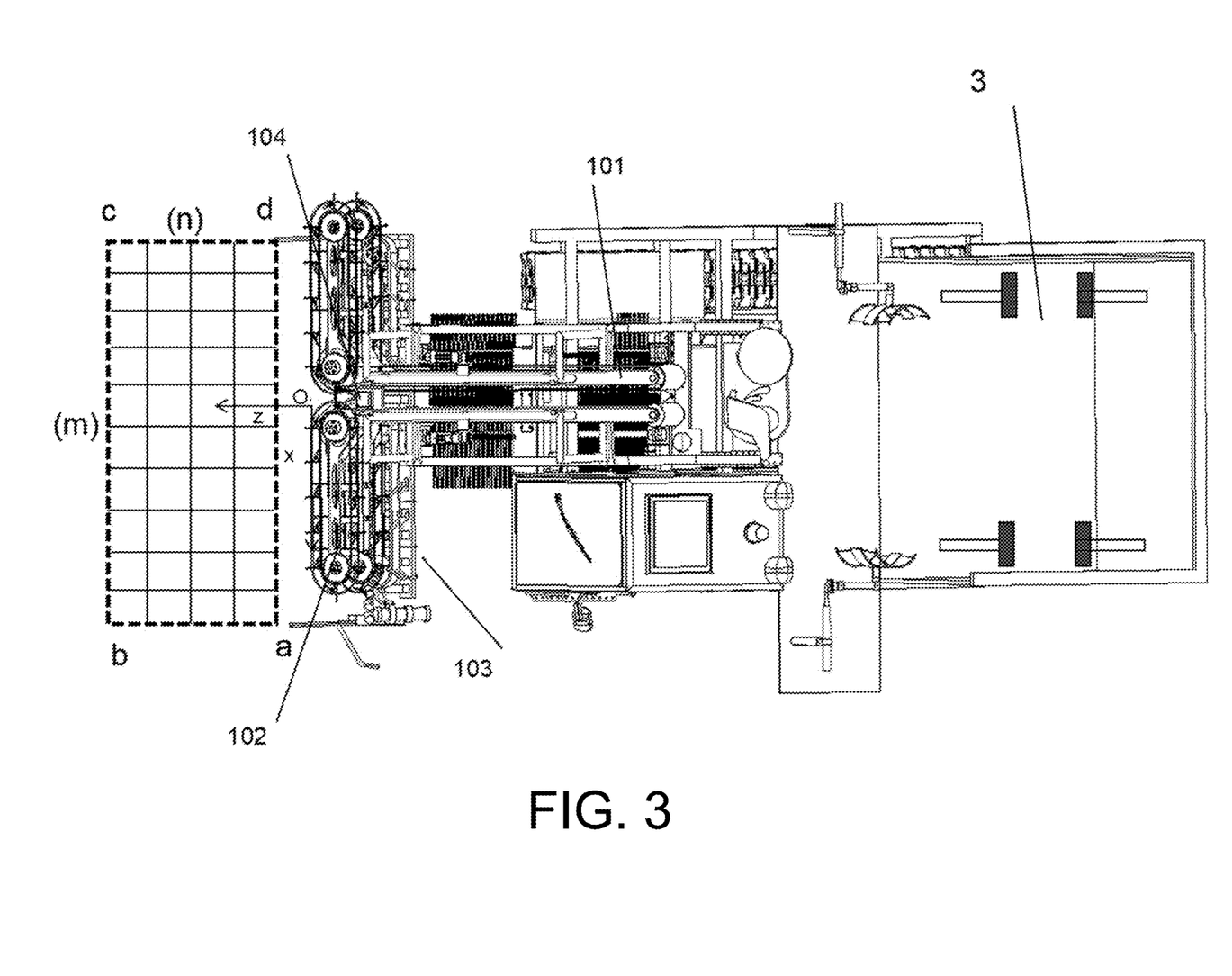
FIG. 3 is a schematic view for processing point cloud data according to an implementation of the present disclosure.

As shown in FIG. 3, the control unit 7 processes the point cloud data to calculate the average height of the reeds in the preharvest region, specifically including:

The control unit 7 processes the point cloud data, filters out a noise point (an outlier) in the point cloud with a Statistical Outlier Removal filter, filters out a point cloud out of the square region abcd specified in front of the header 1 with a pass-through filter, and retains the point cloud in the square region abcd. The point cloud in the square region reflects biological plant heights of the reeds in front of the header.

The square region abcd is uniformly segmented into m×n sub-regions that are equal. The maximum of the point cloud y coordinate in each of the sub-regions is calculated. The maximum $y_{ijmax}$ is taken as the average height of the reeds in the sub-region. In case of more enough m×n sub-regions that are equal, an error arising from the $y_{ijmax}$ representing the average height of the reeds in the sub-region falls within an acceptable range.

Figure 4:
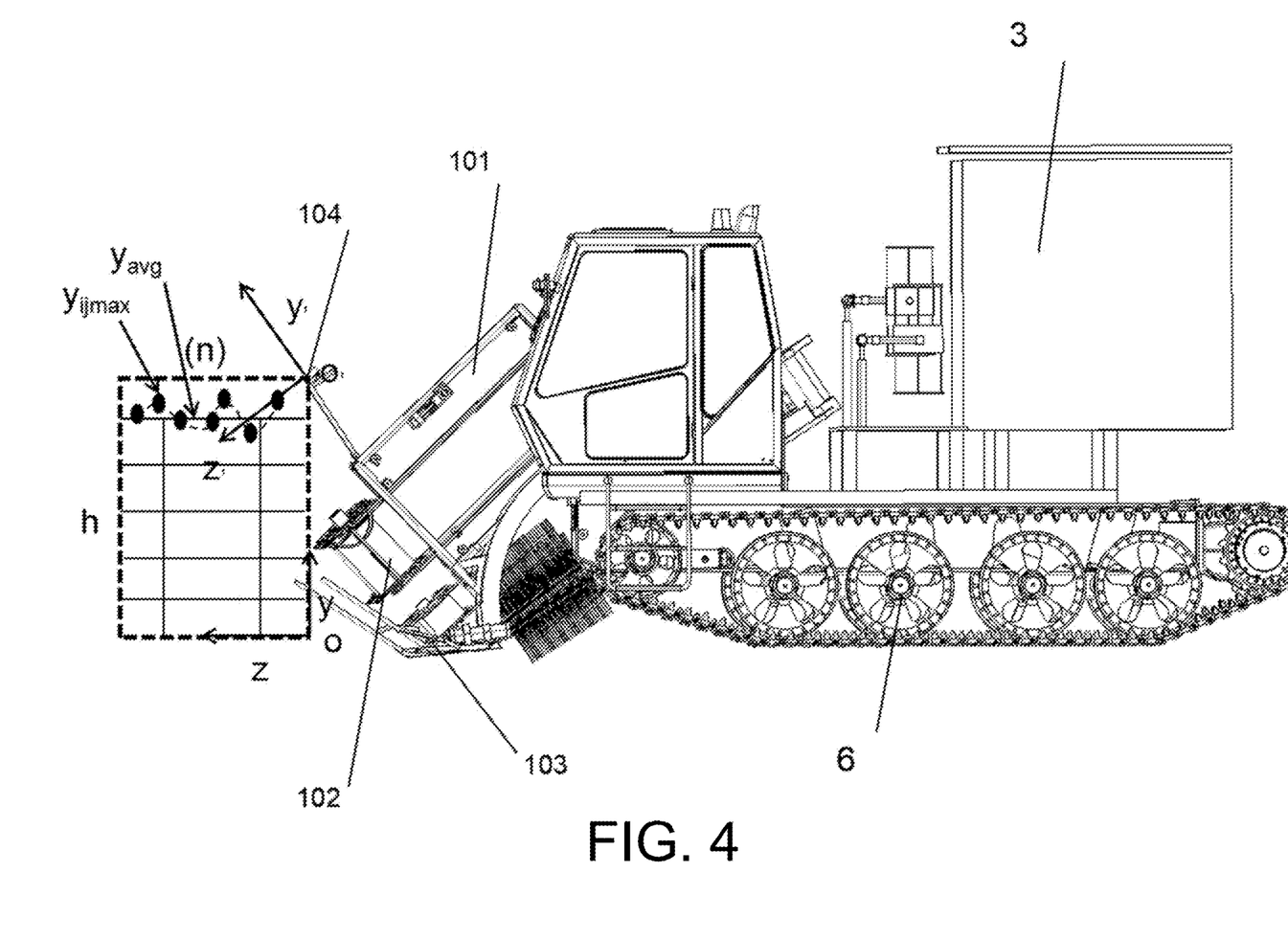
FIG. 4 is a schematic view for fitting an average height of reeds according to an implementation of the present disclosure.
Figure 5:
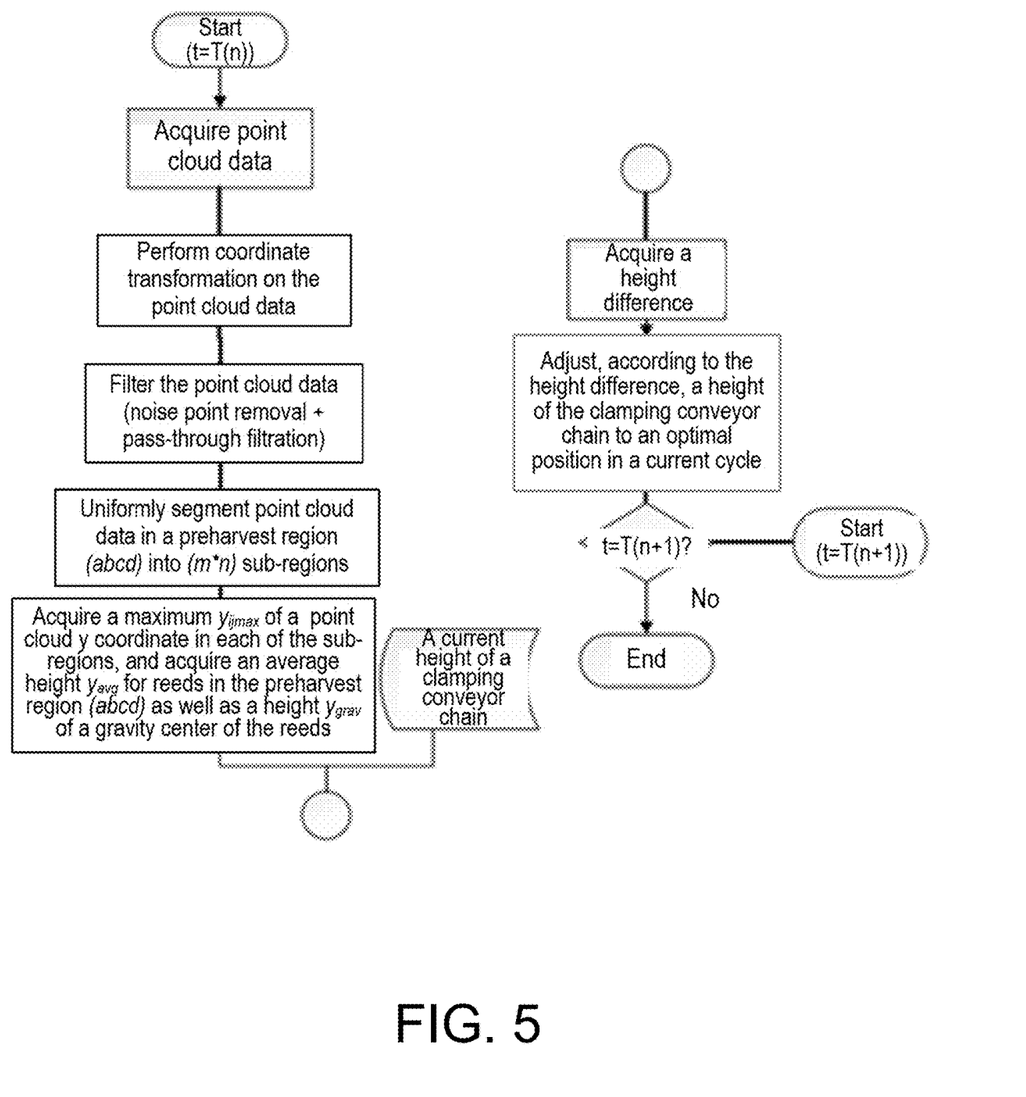
FIG. 5 is a flowchart of preharvest detection on an average height of reeds according to an implementation of the present disclosure.

The average $y_{avg}$ in the square region is sought according to the $y_{ijmax}$ representing the average height of the reeds in each of the sub-regions. The average represents the average height of the reeds in the preharvest region, as shown in FIG. 4. FIG. 5 shows a workflow chart of whole preharvest detection on the heights of the reeds. The laser radar 104 acquires point cloud data at current time t=T(n), and transmits the point cloud data to the control unit 7. The control unit 7 performs coordinate transformation on the point cloud data, filters the point cloud data (noise point removal+pass-through filter), uniformly segments point cloud data in a preharvest region into a plurality of sub-regions, acquires a maximum $y_{ijmax}$ of a point cloud y coordinate in each of the plurality of sub-regions, acquires an average height $y_{avg}$ for reeds in the preharvest region, calculates a height $y_{grav}$ of a gravity center of the reeds, and acquires a current height of the upstanding clamping longitudinal conveyor device 101 through the position sensor. The control unit 7 calculates a height difference between the average height $y_{avg}$ for the reeds and the current height of the upstanding clamping longitudinal conveyor device 101, and adjusts, according to the height difference, a position of the upstanding clamping longitudinal conveyor device 101 in a current cycle to correspond to the gravity center of the reeds in the preharvest region. In case of t=T(n+1), a next cycle is started to adjust (t=T)n+1)), n representing the current cycle, and n+1 representing the next cycle.

Preferably, the height of the gravity center of the reeds is an actual length $\tfrac{2}{3}h_2$ of the reed, $h_2 = y_{avg} - h_1$, namely $y_{grav} = \tfrac{2}{3}(y_{avg} - h_1)$, $h_1$ being a height detected by a knife height sensor (103-1) for a knife above the ground.

Figure 8:
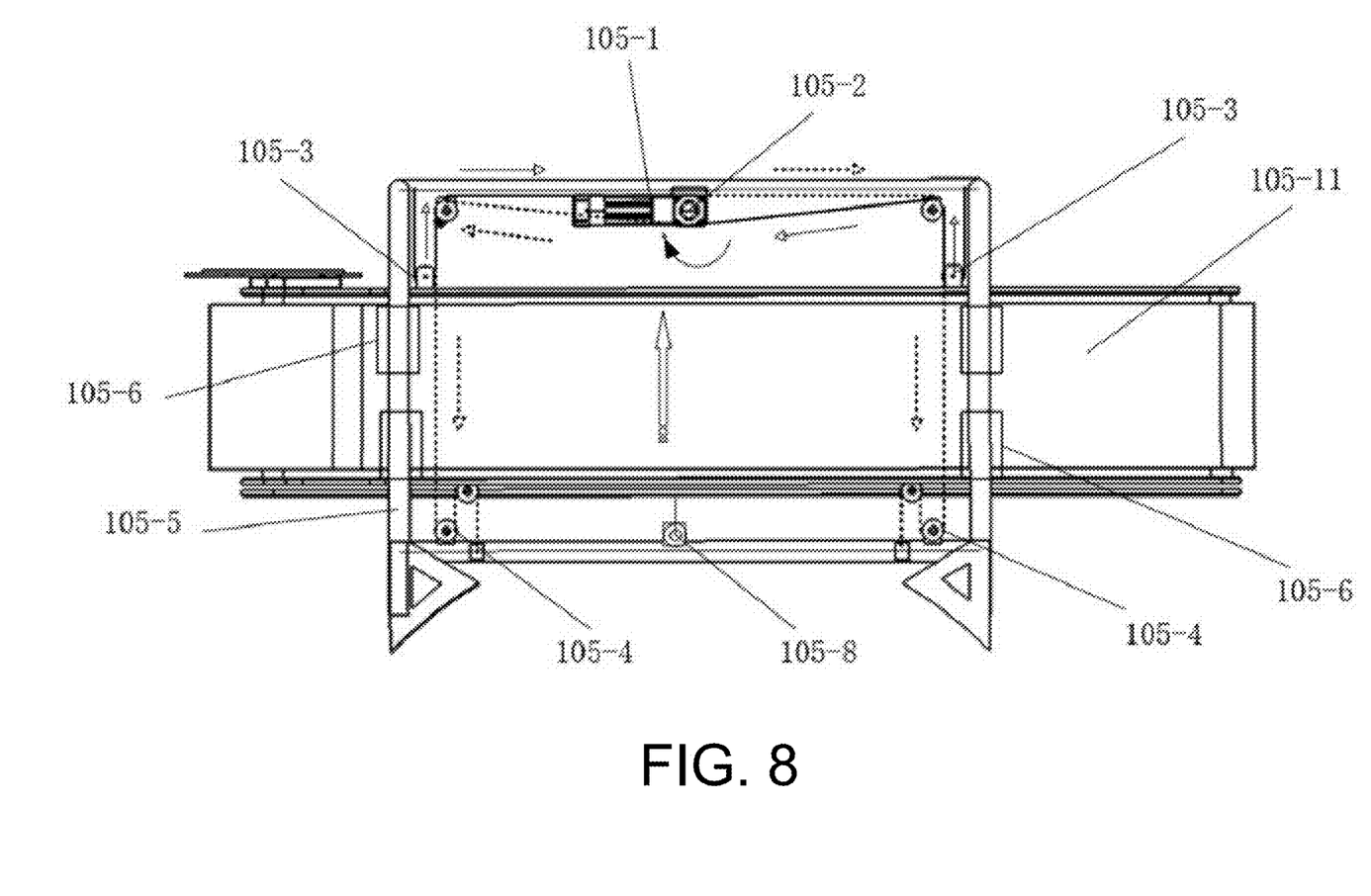
FIG. 8 is a schematic view illustrating that a clamping conveyor chain moves up according to an implementation of the present disclosure.
Figure 9:
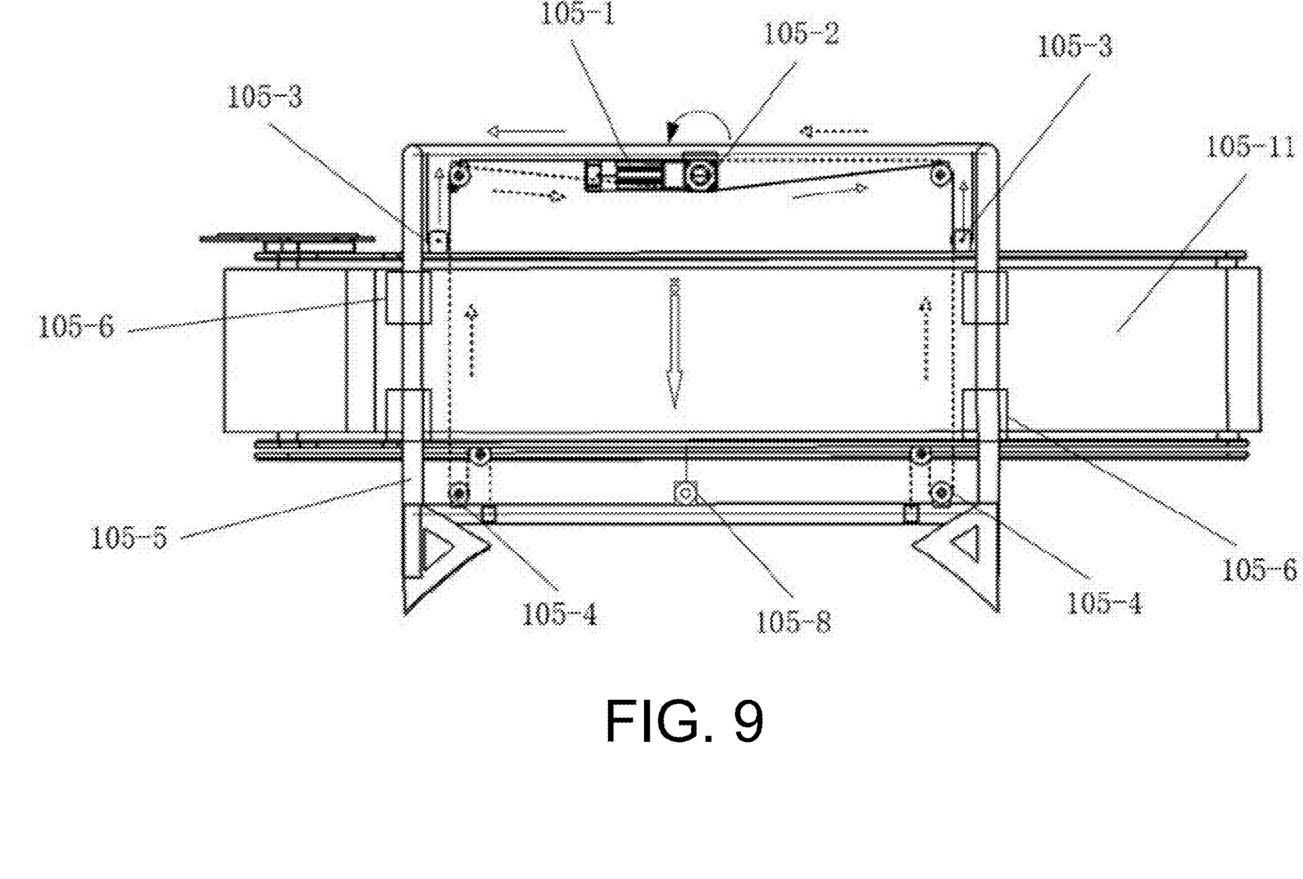
FIG. 9 is a schematic view illustrating that a clamping conveyor chain moves down according to an implementation of the present disclosure.

As shown in FIG. 7 to FIG. 9, the lifting device adjusts the position of the upstanding clamping longitudinal conveyor device 101 to correspond to the gravity center of the reeds in the preharvest region, specifically including:

The speed reduction motor 105-1 of the lifting device drives the coupled twin winch 105-2 to rotate clockwise. The coupled twin winch 105-2 includes a driving pulley A and a driving pulley B. The driving pulley A and the driving pulley B are fixedly connected and rotate at the same time. The driving pulley A in the coupled twin winch 105-2 drives the first pulley set 105-3. As shown by a solid line in FIG. 7, the first pulley set 105-3 driven by the driving pulley A in the coupled twin winch drives the upstanding clamping longitudinal conveyor device 101 to move up. The driving pulley B in the coupled twin winch 105-2 is connected to the second pulley set 105-4. As shown by a dotted line in FIG. 7, the driving pulley B is in a rope releasing state, to ensure that the upstanding clamping longitudinal conveyor device 101 moves up.

The speed reduction motor 105-1 drives the coupled twin winch 105-2 to rotate counterclockwise. The driving pulley B in the coupled twin winch 105-2 drives the second pulley set 105-4. As shown by a dotted line in FIG. 8, the second pulley set 105-4 driven by the driving pulley B in the coupled twin winch drives the upstanding clamping longitudinal conveyor device 101 to move down. The driving pulley A in the coupled twin winch 105-2 is connected to the first pulley set 105-3. As shown by a solid line in FIG. 8, the driving pulley A is in a rope releasing state, to ensure that the upstanding clamping longitudinal conveyor device 101 moves down.

Embodiment 2

Figure 1:
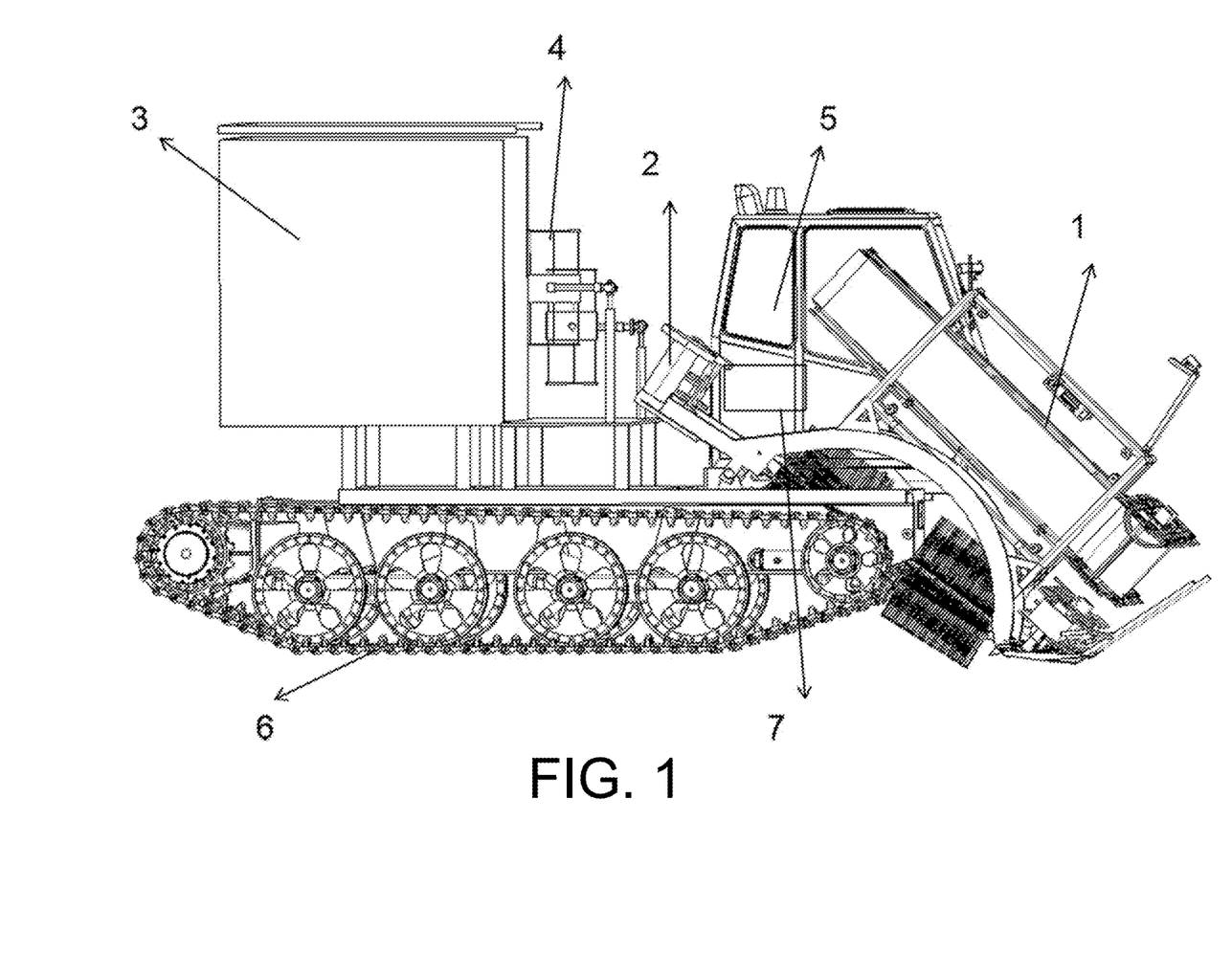
FIG. 1 is a schematic view of a reed harvester according to an implementation of the present disclosure.

The present disclosure provides a harvester. The harvester includes a knotter 2, a feed box 3, a stacking mechanism 4, a cab 5, a chassis 6, and the upstanding clamping longitudinal conveyor system for whole-stem reed harvesting in Embodiment 1. Hence, the harvester has the beneficial effects in Embodiment 1, which is not repeated herein. The header 1, the knotter 2, the feed box 3, the stacking mechanism 4, and the cab 5 are provided on the chassis 6.

The header 1 includes the upstanding clamping longitudinal conveyor device 101, a transverse conveyor device 102, and a knife 103. The transverse conveyor device 102 is provided in front of the upstanding clamping longitudinal conveyor device 101. The knife 103 is provided under the transverse conveyor device 102. The upstanding clamping longitudinal conveyor device 101 is connected to the clamping conveyor chain height adjustment mechanism. The knotter 2 is located behind the upstanding clamping longitudinal conveyor device 101. The stacking mechanism 4 is located behind the knotter 2. The knotter 2 is configured to knot reeds conveyed from the upstanding clamping longitudinal conveyor device 101 into small bales. The stacking mechanism 4 is configured to stack the small bales of reeds into the feed box 3.

It should be understood that although this specification is described in accordance with the embodiments, not every embodiment only includes one independent technical solution. This description of the specification is for the sake of clarity only. Those of skill in the art should take the specification as a whole, and the technical solutions in embodiments can also be appropriately combined to form other implementations that can be understood by those of skill in the art.

The series of detailed description listed above are only specific illustration of feasible embodiments of the present disclosure, rather than limiting the claimed scope of the present disclosure. All equivalent embodiments or changes made without departing from the technical spirit of the present disclosure should be included in the claimed scope of the present disclosure.

The invention claimed is:

1. An upstanding clamping longitudinal conveyor system for whole-stem reed harvesting, comprising an upstanding clamping longitudinal conveyor device, a height adjustment mechanism, and a control unit, wherein
the height adjustment mechanism comprises a preharvest detection unit, a position sensor, and a lifting device; the preharvest detection unit is configured to detect height information of reeds in a preharvest region, and transmit the height information to the control unit; the position sensor is configured to detect a current height of the upstanding clamping longitudinal conveyor device, and transmit the current height to the control unit; and the lifting device is connected to the upstanding clamping longitudinal conveyor device; and
the control unit is connected to the preharvest detection unit and the lifting device; the control unit is configured to calculate an average height of the reeds in the preharvest region according to the height information detected by the preharvest detection unit for the reeds in the preharvest region, calculate a height of a center of gravity of the reeds, calculate a height difference between the height of the center of gravity of the reeds and the current height of the upstanding clamping longitudinal conveyor device, and control, according to the height difference, the lifting device to adjust a position of the upstanding clamping longitudinal conveyor device to correspond to the center of gravity of the reeds in the preharvest region,
the lifting device comprises a speed reduction motor, a coupled twin winch, a first pulley set, a second pulley set, a support, and a sleeve;
the support is provided at the upstanding clamping longitudinal conveyor device; the support is connected to a girder of a header; and the upstanding clamping longitudinal conveyor device is connected to a vertical beam of the support through the sleeve;
the speed reduction motor and the coupled twin winch are provided on a top of the support; and the first pulley set is provided at two sides of an upper portion of the support, and connected to an upper portion of the upstanding clamping longitudinal conveyor device; and
the second pulley set is provided at two sides of a lower portion of the support, and connected to a lower portion of the upstanding clamping longitudinal conveyor device; a wire rope of the first pulley set and a wire rope of the second pulley set are connected to the coupled twin winch; and the coupled twin winch driven by the speed reduction motor drives the wire rope of the first pulley set and the wire rope of the second pulley set to realize retraction and extension of the wire rope of the first pulley set and the wire rope of the second pulley set, thereby driving the upstanding clamping longitudinal conveyor device to move up and down along the vertical beam of the support.

2. The upstanding clamping longitudinal conveyor system for whole-stem reed harvesting according to claim 1, wherein the preharvest detection unit comprises a laser radar; and
the laser radar is configured to scan to-be-harvested reeds in front of the header at a sampling interval T, acquire point cloud data for reflection points of the to-be-harvested reeds in a polar coordinate of the laser radar, and transmit the point cloud data to the control unit; and the control unit is configured to process the point cloud data to obtain a point cloud in a square region specified in front of the header, uniformly segment the square region into a plurality of sub-regions that are equal, calculate a maximum of a point cloud y coordinate in each of the plurality of sub-regions, take the maximum $y_{ijmax}$ as an average height of reeds in each of the plurality of sub-regions, and calculate an average $y_{avg}$ in the square region according to the $y_{ijmax}$ representing the average height of the reeds in each of the plurality of sub-regions, wherein the average $y_{avg}$ represents the average height of the reeds in the preharvest region,
the height of the center of gravity of the reeds is an actual length $$\frac{2}{3}h_2$$

of the reeds, wherein $h_2=y_{ave}-h_1$, and $$y_{grav} = \frac{2}{3}(h_{avg} - h_1),$$

wherein, $y_{grav}$ represents the height of the center of gravity of the reeds, and $h_1$ represents a height detected by a knife height sensor for a knife above a ground.

3. The upstanding clamping longitudinal conveyor system for whole-stem reed harvesting according to claim 1, wherein the upstanding clamping longitudinal conveyor device comprises two symmetric upstanding longitudinal conveyor mechanisms; and the two symmetric upstanding longitudinal conveyor mechanisms clamp upstanding reeds when longitudinally conveying the reeds;
the two symmetric upstanding longitudinal conveyor mechanisms each comprise an upstanding conveyor unit and the sleeve;
the upstanding conveyor unit comprises a traction roller, a driven roller, a clamping conveyor chain, an upper beam, and a lower beam;
the upper beam is located above the lower beam; the traction roller comprises one end connected to one end of the upper beam, and another end connected to one end of the lower beam; the driven roller comprises one end connected to another end of the upper beam, and another end connected to another end of the lower beam; and the clamping conveyor chain surrounds the traction roller and the driven roller; and the upper beam and the lower beam are connected to the sleeve; the sleeve is provided on the vertical beam of the support; and the sleeve is slidable up and down along the vertical beam of the support, thereby driving the upstanding conveyor unit to move up and down.

4. The upstanding clamping longitudinal conveyor system for whole-stem reed harvesting according to claim 1, wherein the speed reduction motor is provided with an electromagnetic brake system.

5. A harvester, comprising the upstanding clamping longitudinal conveyor system for whole-stem reed harvesting according to claim 1.

6. A control method of the upstanding clamping longitudinal conveyor system for whole-stem reed harvesting according to claim 1, comprising following steps:

setting a coordinate of the laser radar of the preharvest detection unit, and scanning, by a laser radar, the to-be-harvested reeds in front of the header, acquiring point cloud data for reflection points of the reeds at the laser radar, and transmitting the point cloud data to the control unit; and performing, by the control unit, coordinate transformation on the point cloud data, filtering the point cloud data, uniformly segmenting the point cloud data in the preharvest region into a plurality of sub-regions, acquiring a maximum $y_{ijmax}$ of a point cloud y coordinate in each of the plurality of sub-regions, calculating the average height $y_{avg}$ for the reeds in the preharvest region, calculating the height of the center of gravity of the reeds, and acquiring the current height of the upstanding clamping longitudinal conveyor device through the position sensor; calculating, by the control unit, the height difference between the height of the center of gravity of the reeds and the current height of the upstanding clamping longitudinal conveyor device; and controlling, according to the height difference, the lifting device to adjust the position of the upstanding clamping longitudinal conveyor device to correspond to the center of gravity of the reeds in the preharvest region, wherein the setting of the coordinate of the laser radar of the preharvest detection unit specifically comprises:

providing a laser radar base with an adjustable dip angle on a top of the header and at a height of h above the ground, setting the dip angle of the laser radar base as θ, and providing the laser radar on the laser radar base, wherein an origin O' in the polar coordinate of the laser radar has the height of h above the ground;

establishing a geodetic coordinate system O (X, Y, Z) on the ground fittingly below the origin O' in the polar coordinate of the laser radar, wherein a vertical distance from an origin O in the geodetic coordinate system to the origin O' in the polar coordinate of the laser radar is the height h;

establishing, with the origin O' in the polar coordinate of the laser radar as an origin, a rectangular coordinate system O' (X', Y', Z') along a direction for setting the dip angle θ, wherein the rectangular coordinate system comprises an X' axis having a same direction as an X axis of the geodetic coordinate system, a Y' axis forming an included angle of θ with a Y axis of the geodetic coordinate system, and a Z' axis forming an included angle of θ with a Z axis of the geodetic coordinate system; and scanning, by the laser radar, the to-be-harvested reeds in front of the header at a sampling interval T, acquiring the point cloud data for the reflection points of the reeds in the polar coordinate of the laser radar, and transmitting the point cloud data to the control unit, wherein the cloud point data comprises a radius, an elevation, an azimuth, and an intensity of each of the reflection points; and the performing, by the control unit, of the coordinate transformation on the point cloud data specifically comprises:

transforming, by the control unit, the point cloud data into rectangular coordinate values in the rectangular coordinate system O' (X', Y', Z'), according to the radius, the elevation, and the azimuth of each of the reflection points in the point cloud, by:

$$\begin{cases} X' = radius \cdot cos(evelation) \cdot cos(azimuth) \\ Y' = radius \cdot cos(evelation) \cdot sin(azimuth) \\ Z' = radius \cdot sin(evelation) \end{cases}$$

wherein, X', Y', and Z' are respectively three coordinate axes in the rectangular coordinate system O'; and transforming, by the control unit, the rectangular coordinate values of the point cloud in the rectangular coordinate system O' (X', Y', Z') into coordinate values in the geodetic coordinate system O (X, Y, Z) by:

$$\begin{Bmatrix} X = X' \\ Y = Y' \cdot cos\theta + h \\ Z = Z' \cdot sin\theta \end{Bmatrix}$$

wherein, X, Y, and Z are respectively three coordinate axes in the geodetic coordinate system O.

7. The control method of the upstanding clamping longitudinal conveyor system for whole-stem reed harvesting according to claim 6, wherein processing, by the control unit, the point cloud data to calculate the average height of the reeds in the preharvest region specifically comprises:

processing, by the control unit, the point cloud data, filtering out a noise point in the point cloud with a filter, filtering out a point cloud out of a square region specified in front of the header with a pass-through filter, and retaining the point cloud in the square region, wherein the point cloud in the square region reflects canopy height information of the reeds in front of the header; and uniformly segmenting the square region into the plurality of sub-regions that are equal, calculating the maximum of the point cloud y coordinate in each of the plurality of sub-regions, taking the maximum $y_{ijmax}$ as the average height of the reeds in each of the plurality of sub-regions, and calculating the average $y_{avg}$ in the square region according to the $y_{ijmax}$ representing the average height of the reeds in each of the plurality of sub-regions, wherein the average $y_{avg}$ represents the average height of the reeds in the preharvest region.

8. The control method of the upstanding clamping longitudinal conveyor system for whole-stem reed harvesting according to claim 6, wherein adjusting, by the lifting device, the position of the upstanding clamping longitudinal conveyor device to correspond to the center of gravity of the reeds in the preharvest region specifically comprises:

driving, by the speed reduction motor of the lifting device, the coupled twin winch to rotate clockwise, wherein a driving pulley A in the coupled twin winch drives the first pulley set, and the first pulley set driven by the driving pulley A in the coupled twin winch drives the upstanding clamping longitudinal conveyor device to move up; and a driving pulley B in the coupled twin winch is connected to the second pulley set, and the driving pulley B is in a rope releasing state, to ensure that the upstanding clamping longitudinal conveyor device moves up; and driving, by the speed reduction motor, the coupled twin winch to rotate counterclockwise, wherein the driving pulley B in the coupled twin winch drives the second pulley set, and the second pulley set driven by the driving pulley B in the coupled twin winch drives the upstanding clamping longitudinal conveyor device to move down; and the driving pulley A in the coupled twin winch is connected to the first pulley set, and the driving pulley A is in a rope releasing state, to ensure that the upstanding clamping longitudinal conveyor device moves down.

\* \* \* \* \*